Figure 1:
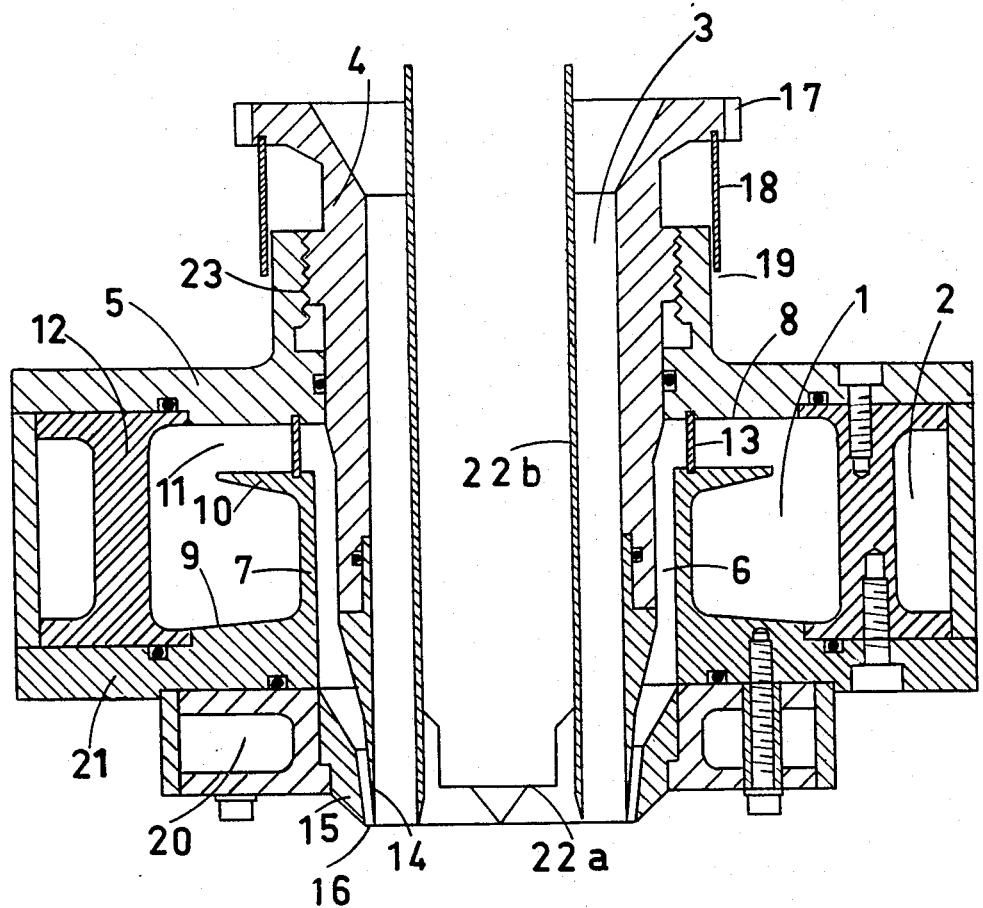

United States Patent [19]

Badertscher et al.

[11] Patent Number: 4,489,887
[45] Date of Patent: Dec. 25, 1984

[54] AGGLOMERATION NOZZLE

[75] Inventors: Ernest Badertscher, Orbe; Pierre Grobety, Neuchâtel, both of Switzerland

[73] Assignee: Societe d'Assistance Technique pour Produits Nestle S.A., Lausanne, Switzerland

[21] Appl. No.: 440,261

[22] Filed: Nov. 9, 1982

[30] Foreign Application Priority Data

Nov. 30, 1981 [CH] Switzerland ............... 7645/81

[51] Int. Cl.³ .................................. B05B 1/24
[52] U.S. Cl. ........................... 239/132.1; 239/134; 239/139; 239/422; 239/424
[58] Field of Search ........... 239/132, 133, 134, 139, 239/600, 135, 132.1, 422, 424, 336

[56] References Cited

U.S. PATENT DOCUMENTS

| | | | |
|---|---|---|---|
| 1,779,849 | 10/1930 | Lusk | 239/133 X |
| 2,827,330 | 3/1958 | Baur | 239/132.1 X |
| 4,065,057 | 12/1977 | Durmann | 239/133 X |
| 4,221,339 | 9/1980 | Yoshikawa | 239/422 X |

Primary Examiner—John J. Love
Assistant Examiner—Mary F. McCarthy
Attorney, Agent, or Firm—Vogt & O'Donnell

[57] ABSTRACT

An agglomeration nozzle with an axial passage for the product and an annular duct coaxial with the passage. An annular distribution chamber coaxial with the duct and passage supplies the agglomeration fluid to the duct. A first heating chamber surrounds the distribution chamber and a second heating chamber is disposed below the distribution chamber adjacent the end of the duct. A heating fluid may be introduced into the heating chambers to maintain the distribution chamber and duct at an elevated temperature.

8 Claims, 2 Drawing Figures

AGGLOMERATION NOZZLE

The present invention relates to an agglomeration nozzle comprising a main housing having a vertical, axial opening in which the following elements are provided: an axial passage for the admission of a pulverulent product to be agglomerated, at least one annular discharge duct coaxial with and outside the axial passage for the discharge of an agglomeration fluid, and at least one annular distribution chamber coaxial with and outside the duct for the distribution of the agglomeration fluid into the duct.

Various agglomeration nozzles are known which have a vertical axis of symmetry and comprise, in a coaxial arrangement, at least one passage for a pulverulent product to be agglomerated and at least one duct for the discharge of an agglomeration fluid, for example steam. These nozzles are generally positioned at the top of an agglomeration tower which is traversed, if necessary, by a current of hot air for drying the agglomerates, formed in an agglomeration zone located at a certain distance below the nozzle, while they fall to the bottom of the tower. Many arrangements of the various elements of the nozzle have been proposed to improve, for example, the efficiency and the quality of the surface moistening of the particles to be agglomerated, the frequency of collisions between moistened particles and the control of the size and the density of the agglomerates formed. For example, the use of multiple coaxial ducts has been proposed which have annular discharge openings positioned at intervals along the axial passage of the pulverulent product to cause improved turbulence and mixing between the pulverulent product and the agglomeration fluid. Another proposal is to discharge the agglomeration fluid through an external coaxial duct, and also by an internal axial duct, so that the stream or pulverulent product is not only contacted from the outside but also from the inside. Finally, the use of several coaxial ducts or streams of different fluids is known, such fluids including steam, hot air and/or fresh air for example, to either obtain a cooling effect of the pulverulent product and to improve the condensation of the steam on the particles to be agglomerated, or to prevent the particles from adhering to hot parts, such as the parts forming the steam outlet opening, or to dry barely formed agglomerates.

One disadvantage of these known nozzles is their specific character and their lack of flexibility to adaptation to the agglomeration of pulverulent products or mixtures of pulverulent products with widely varying characteristics, for example with respect to the shape and the regularity of the particles, their chemical composition, their solubility, their hygroscopicity, their crystallisation state, their porosity or their density. A known nozzle which is calculated and designed for a specific use does not often lend itself to the agglomeration of another pulverulent product which requires the study and the development of another nozzle. Another shortcoming of these known agglomeration nozzles is the difficulty which is often encountered in avoiding drops of condensation formed by the agglomeration fluid on certain parts of the nozzle. These droplets are capable of seriously disrupting the agglomeration process and damaging the resulting product.

An object of the present invention is to overcome these defects and to provide an improved nozzle of the type mentioned above which is characterised by its flexibility of adaptation equally well to the treatment of the most varied pulverulent products and to slight variations in one determined pulverulent product or in operating conditions, and its clean operation.

For this purpose, the agglomeration nozzle according to the present invention also comprises at least one first annular, coaxial heating chamber which is outside and adjacent to the distribution chamber, for heating the latter chamber, and at least one second annular, coaxial heating chamber which is outside and adjacent the end of the discharge duct and is positioned below the distribution chamber, for heating the latter chamber and the outlet end of the duct.

By this construction principle the formation of undesirable droplets is to a large extent avoided by greatly reducing the condensation of agglomeration fluid in the distribution chamber and at the end of the discharge duct. This design also allows an economic, robust and compact construction.

In a preferred embodiment of the nozzle, the axial passage is defined by an inlet pipe which is screwed into the top part of the housing and is adjustable by rotation about its axis. The duct is defined inside by the external surface of the inlet pipe and outside by an inside wall of the distribution chamber. This design allows adjustment of the opening at the outlet of the duct during operation by relative movement of the walls defining it.

The annular distribution chamber preferably comprises a ceiling, a floor which is inclined radially towards the outside for draining condensates of the agglomeration fluid, an inside wall which has at its top part a flange directed radially and outwardly, an annular distribution opening between the flange and the ceiling, and an outside wall forming an inside wall of the first heating chamber.

Moreover, a filter may be positioned in the annular distribution opening. With this design, any condensates that might form, which would normally be entrained with the agglomeration fluid or condensates which might still be formed in the distribution chamber cannot enter the duct and may be easily removed.

The end of the discharge duct is preferably formed between an internal insert which is attached to the lower end of the inlet pipe and an external insert positioned in the extension of the inside wall of the distribution chamber, the two inserts being removable and defining a converging, conical, annular discharge slit, the width of the slit being adjustable during operation by rotating the pipe in the housing. Thus, when the flow rate of the agglomeration fluid or the angle of attack of the jet of fluid has to be radically modified when the pulverulent product is changed it is not necessary to change the whole nozzle but only the inserts. However, when the speed or the flow rate of the agglomeration fluid has to be adapted to slight variations in the characteristics of the same pulverulent product or to slight variations in operating conditions, the adaptation may be made during operation without shutting down the equipment.

Finally, the parts of the agglomeration nozzle are preferably made of stainless steel and the external thread of the pipe, the corresponding internal thread of the housing and the internal insert of the duct are plated with amorphous nickel. The purpose of plating the thread is to avoid sticking and to allow the adjustment, during operation, of the nozzle by precise and continuous rotation of the pipe within the housing. The nickel plating of the internal insert should help to prevent the pulverulent product from adhering to the downstream end of the axial passage.

In a particular embodiment of the present agglomeration nozzle, the axial passage is annular and is defined on the inside by a guide tube inside which a two-fluid nozzle is positioned for the projection of a fine spray. This modification, which fits into the general design of the nozzle, may in practice be effected at any time by positioning the guide tube and a conventional two-fluid nozzle in the inlet pipe. It allows, for example, the agglomeration of special pulverulent products, such as certain products which are rich in starch and require a considerable supply of moisture which may range up to 20% by weight of the pulverulent product, the normal being a few percent of solvent with respect to the weight of the particles to be agglomerated. Such a quantity of moisture cannot be transported by the agglomeration fluid in the form of dry steam. Therefore, a central two-fluid nozzle of the Venturi tube type, for example, in which the liquid would be water and the aspiration and projection gas would be steam is provided which forms a mist of microscopic drops of water falling onto the agglomeration zone and thus supplying the necessary auxiliary moisture. This construction permits spraying of solutions of aromatizing agents, binders, colouring agents or other materials onto the aggregates being formed in the agglomeration zone.

Likewise, it is also possible to provide several coaxial ducts around the axial passage.

In another specific embodiment, the agglomeration nozzle comprises a removable secondary housing below the main housing and secured to or spaced from the main housing. This secondary housing also has an axial passage and, coaxially from the inside towards the outside, at least one fluid discharge duct, a fluid distribution chamber and a heating chamber. This embodiment enhances the agglomeration effect by providing a mixing movement and an auxiliary moistening with an agglomeration fluid . It also prevents particles which have already been moistened from rising and avoids accumulation of particles in dead spaces by projecting compressed air into the critical areas, especially close to the inserts.

Similarly, the inlet pipe may have a dummy wall along its internal surface for the circulation and discharge of compressed air at its lower end to prevent the return of particles or steam. The dummy wall, which is insulated and cooled by the circulation of compressed air, helps to prevent the dry particles from adhering to the pipe while passing through it.

The nozzle is used in an agglomeration installation which comprises an agglomeration tower equipped with the necessary devices, such as conduits for the supply of agglomeration or other fluids, and a means for supplying pulverulent products at the top of the tower as well as a device for removing agglomerates which is collected at the bottom of the tower, as well as auxiliary devices such as means for removing the condensates, a drier circulating hot air from the bottom of the tower to the top where it is evacuated by a cyclone or a fluidized bed drier downstream of the device for removing the agglomerates.

The nozzle is designed for positioning at the top of such a tower. For operation, the distribution chamber or chambers are connected to the agglomeration fluid supply by means of inlets provided for this purpose in the outside wall of the chambers. One or more inlets may be provided, particularly tangential inlets, per distribution chamber. Likewise, the annular heating chambers are connected to the supply of heating or temperature-control fluids by means of one or more inlets, preferably tangential inlets, provided for this purpose in the outside wall of each heating chamber. This procedure is carried out analogously for any other fluids that might be supplied, such as compressed air, to the chambers for distribution of these fluids provided in the housing of the nozzle or in the optional secondary housing. The two-fluid nozzle, where used is also connected to the appropriate supplies of liquid and gas. Finally, the draining outlets in the outside wall of the chambers for the distribution of agglomeration fluid and/or of the heating chambers, if provided, are connected to the means for removing condensates, for example by conduits connected to a receiver, optionally via a pump. This draining operation may be carried out continuously or intermittently, depending on requirements. The pulverulent material to be agglomerated may be introduced into the axial passage by allowing it to fall from a supply device, such as a funnel or a feeder, or a distributor having rotary blades, this latter device being particularly recommended when the axial passage has an annular cross section with the two-fluid nozzle at its centre.

The nozzle may be used for the agglomeration of the most varied pulverulent products or their mixtures. It lends itself particularly well to the agglomeration of pulverulent food products which are often very delicate and require great care in the setting and maintaining of operationing conditions, in the geometrical design of the nozzle and in the choice of materials and fluids.

As far as the latter are concerned, the agglomeration fluids will usually be the gaseous forms of solvents for the particles to be agglomerated, which may condense on the surface of the particles thus causing slight surface dissolution so that the particles adhere to each other and form the desired agglomerates. Auxiliary fluids, such as compressed air, may be used in the conditioning of the pulverulent product, particularly for cooling, or in the permanent cleaning of critical zones, such as dead spaces. Solutions of aromatic substances or seasonings, or solutions of binding, colouring agents or emulsifying agents may also be used, as indicated above, combined with a propellant gas, such as air or the solvent , in gaseous form for agents, using the two-fluid nozzle. Finally, the heating or temperature-control fluids for the chambers will be selected in order to maintain in the distribution chambers, by heat exchange, a temperature which is favourable for maintaining the agglomeration fluid in a completely gaseous phase. Thus, steam under a pressure of a few bars may be used as heating fluid if the agglomerating fluid is also steam, at practically atmospheric pressure or slightly above.

A wide range of relative quantities or proportions, by weight, of agglomeration fluid to the pulverulent products to be agglomerated, may be used depending on the requirements peculiar to the individual pulverulent products.

These proportions may be reduced to a very low level, just a fraction of a percent by weight of the particles to be agglomerated, by narrowing the discharge slit or by diluting the agglomeration fluid with a carrier gas, for example by mixing air and steam. The proportions may also be raised to a very high level, up to about ten or twenty percent by weight of the particles to be agglomerated, by enlarging the discharge slit or by using the secondary housing or the two-fluid nozzle.

As far as the respective dimensions of the nozzle and of the installations are concerned, as well as the possible hourly flow rates, it is possible to say that the present nozzle readily allows fast flow rates for modest dimensions. It is possible to mention, by way of illustration, flow rates of a few hundred kg to 1 tonne of agglomerates per hour for a diameter of the annular discharge slit of about 5 or 6 cm, the width of this slit varying from about 1 to 4 mm and for a tower height of about 2 or 3 metres.

Figure 2:
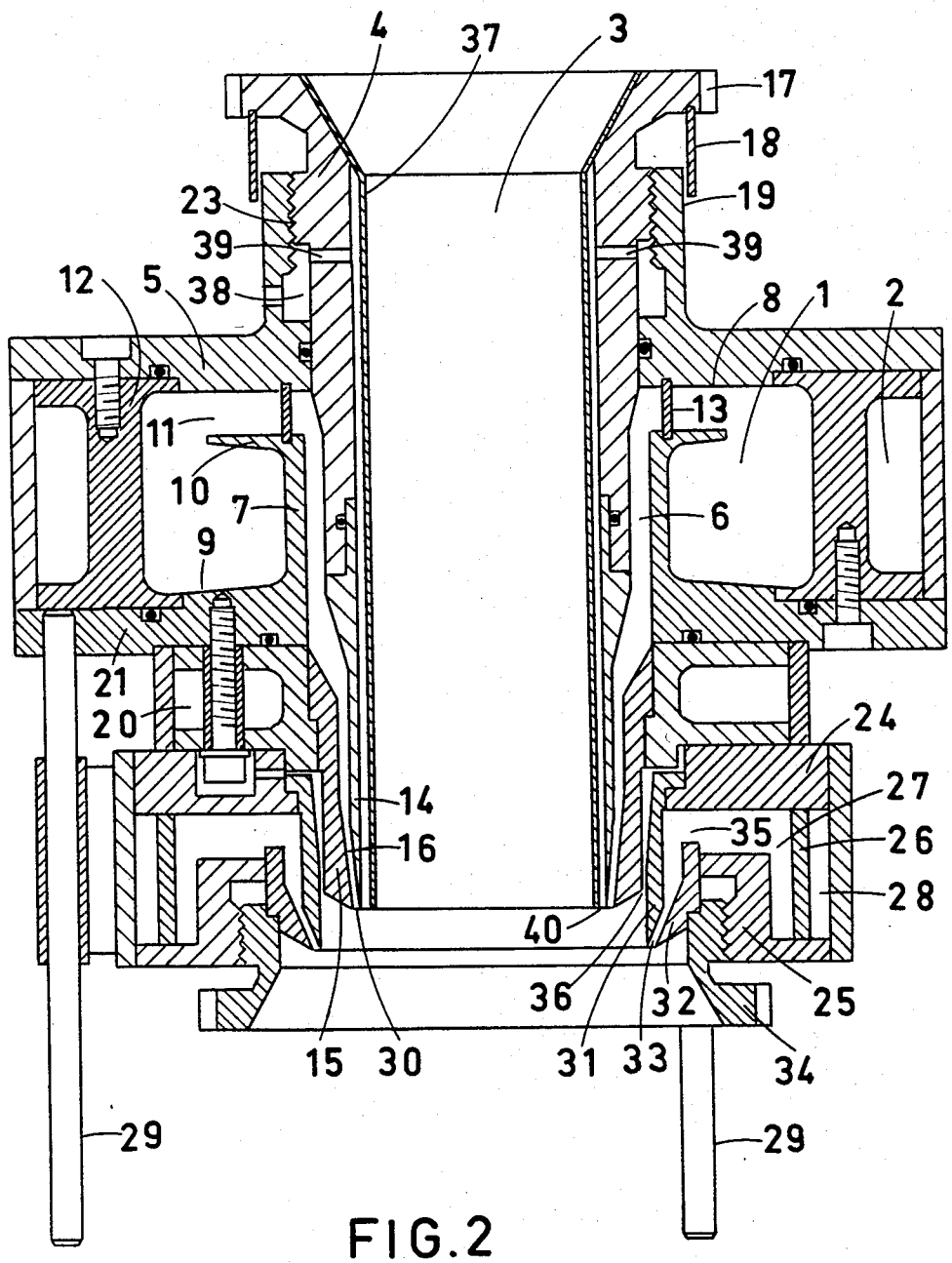

The nozzle according to the present invention is described in more detail in the following with reference to the accompanying drawings which are provided by way of example. In the drawings:

FIG. 1 illustrates a view in vertical section of one embodiment of the present nozzle, and FIG. 2 illustrates a view in vertical section of another embodiment.

By referring to FIG. 1, it may be seen that the main nozzle housing is shaped like a crown containing a chamber 1 for the distribution of an agglomeration fluid and a first chamber 2 for heating the distribution chamber 1. An axial passage 3 for pulverulent product to be agglomerated has an annular cross section and is defined on the outside by an inlet pipe 4 which is screwed into the top part 5 of the housing and is adjustable by rotation about its axis.

A duct 6 for the discharge of agglomeration fluid is delimited on the inside by the external surface of the pipe 4 and on the outside by the inside wall 7 of the distribution chamber 1.

The latter comprises a ceiling 8 provided by the upper part 5 of the housing, a floor 9 inclined radially towards the outside to drain condensates of the agglomeration fluid, the inside wall 7 having at its top part a flange 10 which is directed radially and outwardly, an annular distribution opening 11 between the flange 10 and the ceiling 8, and an outside wall 12 forming an internal wall of the first heating chamber 2. A filter 13 is positioned in the annular distribution opening 11.

The end of the duct 6 is formed from an internal insert 14 secured at the lower end of the inlet pipe 4 and from an external insert 15 which is positioned in the extension of the inside wall 7. The two inserts are removable and define a converging, conical, annular discharge slit 16, the width of the slit being adjustable during operation by rotating the pipe 4 in the nozzle housing. To this end, the top end of the pipe 4 which is hollowed out has a milled rim 17 and a pointer 18 which allows the precise position of the pipe to be read off on a graduated scale 19 provided on the upper part 5 of the housing. A second annular, coaxial heating chamber 20 is outside and adjacent to the external insert 15 which it keeps in place by itself being screwed to the base of the distribution chamber 1, this base forming an integral part of the lower part 21 of the nozzle housing.

Finally, it may be seen that in the centre of the axial passage 3, a conventional two-fluid nozzle 22a is positioned in a guide tube 22b.

The upper part 5 and the lower part 21 of the nozzle housing are connected by an "I" profile wall 12, and fastened by screws to provide a compact, robust housing. Problems of tightness, which are very important in a construction of this type, have been resolved by providing "O" rings, represented by solid circles in rectangular boxes, wherever it has proved necessary. Some parts, such as the outside walls of the heating chambers are welded. The internal insert 14 is pushed loosely into the end of the pipe 4. Practically all the parts are made of stainless steel. The internal insert 14, as well as the thread 23, with the internal thread in the upper part 5 of the body and the external thread at the top part of the inlet pipe 4 are plated with amorphous nickel.

The respective inlets (not shown) of the agglomeration and the heating fluids are made tangentially in the outside wall of the distribution chamber 1 and of the heating chambers 2 and 20. Likewise, draining outlets (not shown) are provided in the bottom of the outside wall of all these chambers.

In the description of the embodiment illustrated in FIG. 2, the same reference numerals as in FIG. 1 are used to designate elements or parts which are identical or fulfill the same function. Thus, also in this Figure, the housing comprises an upper part 5 and a lower part 21 which are connected by a wall 12 and enclose a distribution chamber 1 and a first heating chamber 2. Likewise, an inlet pipe 4 is again screwed into the housing by the thread 23 and may be adjusted by rotating the milled rim 17. The exact position of the pipe may be controlled by the pointer 18 opposite the graduated scale 19. The construction of the distribution chamber 1 is also very similar, with a flange 10 which is in this case cut out from a single block in the lower part 21 of the housing, thus preventing any condensates from entering the distribution opening 11, these condensates flowing away towards the outside along the inclined floor 9.

However, the internal and external inserts are very different, and notably are much longer than those illustrated in FIG. 1. In FIG. 2, a secondary housing 24–26 is fitted, formed from an upper part 24 and a lower part 25 which are interconnected by a median wall 26 separating secondary distribution chamber 27 from its heating chamber 28. This secondary housing 24–26 may either be fixed against the main housing 5–12–21, as illustrated in FIG. 2, or may be spaced away from it along the guide rods 29. Thus, the heating chamber 20 next to the external insert 15 and to the distribution chamber 1 is sandwiched between the main housing and the secondary housing at a certain distance from the annular outlet orifice 30 of the discharge slit 16, so that the upper lip 31 and the lower lip 32 which define the main discharge slit 33 of the secondary housing may be accommodated around the end of the external insert 15. The width of the slit 33 may be adjusted by rotating a ring having a milled rim 34 screwed from below into the lower part 25 of the secondary housing and supporting the lower lip 32. This discharge slit 33 is supplied directly from the distribution chamber 27 through the annular distribution opening 35. Thus, by itself, it forms the whole duct for the discharge of agglomeration fluid from the secondary housing.

The top of the secondary housing and the upper lip 31 are designed so that it is possible to discharge compressed gas such as air through a secondary slit 36 which is defined by the end of the external insert 15 and by the upper lip 31 when the secondary housing is attached directly to it, especially to avoid accumulation of particles between the insert and the lip.

The axial passage 3 of this embodiment, as illustrated in FIG. 2, has a circular cross-section. It is defined by a dummy wall 37 secured at a few points to the inside surface of the pipe 4 and continuously welded between the opening and the upper end of the pipe 4. A compressed gas such as air may be injected below this dummy wall by means of the distribution chamber 38 provided for this purpose in the top part 5 of the housing, and through the distribution openings 39 made in the top of the pipe. The gas is discharged through the annular outlet 40 delimited by the lower end of the dummy wall 37 and by the end of the internal insert 14.

FIG. 2 and FIG. 1 do not illustrate the fluid inlets into the different distribution and heating chambers and the draining outlets, to avoid overloading the drawing and interfering with the clarity thereof.

We claim:

1. An agglomeration nozzle comprising a main housing having a vertical, axial opening in which the following elements are provided: an axial passage for the admission of a pulverulent product to be agglomerated, at least one annular discharge duct which is coaxial with and outside the axial passage for the discharge of an agglomeration fluid, and at least one annular distribution chamber which is coaxial with and outside the duct for the distribution of the agglomeration fluid into the duct, the nozzle also comprising at least one first annular, coaxial heating chamber which is outside and adjacent the distribution chamber for heating the distribution chamber and at least one second annular, coaxial heating chamber which is outside and adjacent the end of the duct, said second heating chamber being positioned below the distribution chamber for heating the distribution chamber and the outlet end of the duct the axial passage being defined by an inlet pipe which is screwed into the top part of the housing, said inlet pipe being adjustable during operation by rotation about its axis, the duct being defined on the inside by the external surface of the inlet pipe and on the outside by an inside surface of the distribution chamber, such surfaces defining a converging conical discharge slit adjacent the outlet end of the duct, whereby the width of the slit may be adjusted during operation by rotating the inlet pipe about its axis.

2. An agglomeration nozzle as claimed in claim 1, wherein the axial passage is annular and is defined on the inside by a guide tube inside which a two-fluid nozzle is positioned for the projection of a fine spray.

3. An agglomeration nozzle comprising a main housing having a vertical, axial opening in which the following elements are provided: an axial passage for the admission of a pulverulent product to be agglomerated, at least one annular discharge duct which is coaxial with and outside the axial passage for the discharge of an agglomeration fluid, and at least one annular distribution chamber which is coaxial with and outside the duct for the distribution of the agglomeration fluid into the duct, the nozzle also comprising at least one first annular, coaxial heating chamber which is outside and adjacent the distribution chamber for heating the distribution chamber and at least one second annular, coaxial heating chamber which is outside and adjacent the end of the duct said second heating chamber being positioned below the distribution chamber for heating the distribution chamber and the outlet end of the duct, the axial passage being defined by an inlet pipe which is screwed into the top part of the housing said inlet pipe being adjustable by rotation about its axis, the duct being defined on the inside by the external surface of the inlet pipe and on the outside by an inside wall of the distribution chamber, the annular distribution chamber comprising a ceiling, a floor which is inclined radially towards the outside for directing condensates of the agglomeration fluid towards the outside, an inside wall having at its top part a flange which is directed radially and outardly, an annular distribution opening between the flange and the ceiling of the distribution chamber and an outside wall forming an inside wall of the first heating chamber.

4. An agglomeration nozzle as claimed in claim 3, wherein an annular filter is positioned in the annular distribution opening.

5. An agglomeration nozzle as claimed in claim 3, wherein the end of the duct is formed between an internal insert attached to the lower end of the inlet pipe and an external insert positioned in the extension of the inside wall of the distribution chamber, the two inserts being removable and defining a converging, conical, annular discharge slit, the width of the slit being adjustable during operation by rotation of the inlet pipe in the housing.

6. An agglomeration nozzle as claimed in claim 5, wherein the elements are made of stainless steel and the external thread of the pipe, the corresponding internal thread of the housing and the internal insert of the duct are plated with amorphous nickel.

7. An agglomeration nozzle comprising a main housing having a vertical, axial opening in which the following elements are provided: an axial passage for the admission of a pulverulent product to be agglomerated, at least one annular discharge duct which is coaxial with and outside the axial passage for the discharge of an agglomeration fluid, and at least one annular distribution chamber which is coaxial with and outside the duct for the distribution of the agglomeration fluid into the duct, the nozzle also comprising at least one first annular, coaxial heating chamber which is outside and adjacent the distribution chamber for heating the distribution chamber and at least one second annular, coaxial heating chamber which is outside and adjacent the end of the duct, said second heating chamber being positioned below the distribution chamber for heating the distribution chamber and the outlet end of the duct, the nozzle further comprising a secondary housing arranged below the main housing, the secondary housing comprising an axial passage and, coaxially from the inside towards the outside, at least one fluid discharge duct, a chamber for the distribution of fluid and a heating chamber.

8. An agglomeration nozzle comprising a main housing having a vertical, axial opening in which the following elements are provided: an axial passage for the admission of a pulverulent product to be agglomerated, at least one annular discharge duct which is coaxial with and outside the axial passage for the discharge of an agglomeration fluid, and at least one annular distribution chamber which is coaxial with and outside the duct for the distribution of the agglomeration fluid into the duct, the nozzle also comprising at least one first annular, coaxial heating chamber which is outside and adjacent the distribution chamber for heating the distribution chamber and at least one second annular, coaxial heating chamber which is outside and adjacent the end of the duct, said second heating chamber being positioned below the distribution chamber for heating the distribution chamber and the outlet end of the duct, the axial passage being defined by an inlet pipe which is screwed into the top part of the housing, said inlet pipe being adjustable by rotation about its axis, the duct being defined on the inside by the external surface of the inlet pipe and on the outside by an inside wall of the distribution chamber, the inlet pipe having a dummy wall along its internal surface for the circulation and discharge of compressed gas at its lower end.

* * * * *